(12) United States Patent
Ross (10) Patent No.: US 8,181,976 B1
(45) Date of Patent: May 22, 2012

(54) ANTI-BINDING SPRING MOUNTING APPARATUS FOR VEHICLE SUSPENSION

(76) Inventor: Brian A. Ross, Plymouth, IN (US)

(*) Notice: Subject to any disclaimer, the term of this patent is extended or adjusted under 35 U.S.C. 154(b) by 171 days.

(21) Appl. No.: 12/488,543

(22) Filed: Jun. 20, 2009

Related U.S. Application Data (60) Provisional application No. 61/074,616, filed on Jun. 21, 2008.

(51) Int. Cl.
*B60G 11/14* (2006.01)

(52) U.S. Cl. ... 280/124.179; 280/124.141; 280/124.142; 280/124.168; 280/124.147; 280/124.155; 267/248

(58) Field of Classification Search ........... 280/124.179, 280/124.168, 124.141, 124.142, 124.166, 280/79, 787, 124.146, 124.147, 124.154, 280/124.155, 124.157; 267/248, 249, 252, 267/255, 286, 288, 291, 267; 248/578, 624, 248/597; 348/218, 225, 232, 233, 518
See application file for complete search history.

(56) References Cited

U.S. PATENT DOCUMENTS

| | | | | |
|---|---|---|---|---|
| 4,108,469 A | * | 8/1978 | Schwarzbich | 280/124.155 |
| 4,497,523 A | * | 2/1985 | Lederman | 384/615 |
| 5,092,568 A | * | 3/1992 | Tachikawa et al. | 267/179 |
| 5,553,836 A | * | 9/1996 | Ericson | 267/286 |
| 5,690,319 A | * | 11/1997 | Robinson et al. | 267/64.19 |
| 6,062,580 A | * | 5/2000 | Kawabe et al. | 280/124.145 |
| 6,098,995 A | * | 8/2000 | Danis | 280/6.152 |
| 6,460,840 B2 | * | 10/2002 | Imaizumi et al. | 267/286 |
| 6,550,755 B2 | * | 4/2003 | Ehrhardt et al. | 267/286 |
| 7,025,343 B2 | * | 4/2006 | Chou | 267/177 |
| 2002/0171223 A1 | * | 11/2002 | Chan | 280/124.179 |
| 2004/0178596 A1 | * | 9/2004 | Furutani et al. | |
| 2004/0232648 A1 | * | 11/2004 | Ohki | 280/124.164 |
| 2004/0240761 A1 | * | 12/2004 | Watai et al. | 384/420 |
| 2005/0247531 A1 | * | 11/2005 | Oota | 188/322.19 |
| 2006/0175787 A1 | * | 8/2006 | Munster et al. | 280/124.145 |
| 2007/0144850 A1 | * | 6/2007 | Hattori | |
| 2007/0164531 A1 | * | 7/2007 | Bryant | 280/124.179 |
| 2007/0170684 A1 | * | 7/2007 | Ohkita et al. | 280/124.147 |
| 2007/0210539 A1 | * | 9/2007 | Hakui et al. | 280/5.514 |
| 2007/0252350 A1 | * | 11/2007 | van der Knapp | |
| 2008/0290624 A1 | * | 11/2008 | Yamanaka et al. | 280/124.154 |

FOREIGN PATENT DOCUMENTS

JP 59040031 A * 3/1984

* cited by examiner

*Primary Examiner* — Ruth Ilan
*Assistant Examiner* — James English
(74) *Attorney, Agent, or Firm* — Jonathan R. Smith; Jonathan Rigdon Smith, PC (57) ABSTRACT

On a jackscrew used to adjust spring tension on the suspension of some vehicles, a bearing is provided to allow one or both spring cups (and hence one or both ends of the spring) to rotate freely relative to each other about the axis of the spring. This relieves undesirable forces between the vehicle body and its undercarriage.

4 Claims, 6 Drawing Sheets

ANTI-BINDING SPRING MOUNTING APPARATUS FOR VEHICLE SUSPENSION

FIELD OF INVENTION

This invention is in the field of vehicles, vehicle suspensions, more specifically spring suspensions for automobiles, and more specifically supports for helical springs and adjustment of the tension thereon.

BACKGROUND OF INVENTION

Springs have long been used to support all of the vehicle parts above its wheel assembly to protect as much of the vehicle as possible, especially the occupants, from road shocks. (Hereinafter, "wheel assembly" will be used to refer to parts which provide support to the lower ends of the springs, such as the wheels, tires, axles, axle tubes, and control arms, and "suspended load" will be used to refer to all of the other parts supported by, and riding up and down on, the springs.) Most often such springs have been horizontally-disposed leaf springs and/or vertically-disposed helical springs composed of resilient metal. A helical spring is typically disposed between a point near the axle or control arm of a wheel at its lower end and some point on the suspended load at its upper, such as a frame rail. Typically the ends of the spring are circular and fit into upper and lower spring retainers, more typically shaped like and referred to as cups. (A shock absorber may be combined with the spring to dissipate the energy of vertical oscillations of the wheel assembly relative to the suspended load, such as the tubular type sometimes mounted along the axis of the spring or the scissors type mounted outside of the spring.)

When a helical spring like this is held more or less vertically and biased downwardly by the weight of the suspended load, more happens to the spring than mere shortening. If the spring is rigidly held at both ends, two forces come into play. One, torque is more or less uniformly applied to every element of the helix (that is, the solid metal of the coil is twisted). This is the source of the "springiness" of the spring. Secondly, the helix material is compressed in the helical direction (that is, along the helical path of the center of the solid coil). This second force occurs because when the spring is compressed, the distance between the fixed ends shortens. The first force manifests itself merely by the flights of the helix becoming closer together, as expected and as readily observed. The second force is less perceptible, however, and manifests itself as a slight uncoiling of the spring. If the ends of the spring are truly fixed so that they cannot turn tangentially relative to one another (that is, they cannot rotate relative to one another about the helical axis of the spring) the force attempting to uncoil the spring tries to push the ends horizontally relative to one another. This is the force that makes a spring "pop out" from between perfectly parallel compressing surfaces, and is of a magnitude comparable to the vertical compressive force.

In an automotive application, the springs simply rest in the spring cups and are held there by the weight of the vehicle. The substantial weight of the vehicle effectively holds the ends of the spring rigidly so that they cannot rotate relative to one another about the axis of the spring. This means that as a car bounces on a road, the springs not only compress vertically but also try to force the suspended load in a horizontal direction relative to the wheel assembly, and vice-versa. When a car is turning, these forces combine to magnify the tendency of the suspended load to sway centrifugally away from the wheel assembly. Ordinarily, other parts in the vehicle are supplied to restrain such motion, such as an anti-sway bar between the front wheels. Springs on opposite sides of the vehicle may be slanted toward each other as well to compensate for this effect.

In an ordinary driving situation, the orientation an elasticity of the springs is selected according to the shape and weight of the vehicle for optimum safety, handling, and comfort on normal roads at normal speeds and under normal loads, and need not be (and often cannot be) changed. In an auto racing environment, in contrast, the way the springs affect handling becomes critical, and means is provided to permit replacement and adjustment of the springs. For this purpose, a jackscrew is interposed between the upper spring cup and the suspended load (typically at the frame rail) to adjust the weight distribution of the car and change the way the car handles in different circumstances. Typically, the jackscrew is male threaded in mating relationship to a female threaded part fixed to the suspended load so that the suspended load can be raised or lowered by turning the jackscrew. (A square drive recess is typically provided in the top of the jackscrew to enable it to be turned with a socket wrench.)

Currently, racing teams are competing using a relatively large anti-sway bar and relatively soft springs. To obtain proper weight distribution on the static vehicle, and in consideration of predicted operating conditions, springs are under a considerable amount of pre-loaded compression. As a result, and in combination with the forces described above, the springs exact great pressures on the spring cups and jackscrew threads, rendering them practically immobile. Also, due to these conditions the spring will not consistently perform as initially rated, as some of the kinetic energy storage capacity of the spring is consumed by the distorting forces described above. A need has therefore been identified for a way to relieve the uncoiling force on automotive springs as it occurs, so that each spring can better perform its purposes of axial suspension of vehicle weight, compression under intermittent load, effective transfer of vehicle weight from wheel to wheel, and dampening of vertical/horizontal forces in proportional amounts to the other suspension components.

OBJECTS OF INVENTION

It is therefore the principal object of the invention to relieve the coiling and uncoiling forces on automotive springs as they occur. Another object of the invention is to relieve lateral forces on the spring cups to prevent twisting of the jackscrew in its bracket. Such twisting and the attendant binding of the threads make it difficult to adjust the jackscrew. Further objects of the invention will become evident as the invention is described in detail below.

BRIEF DESCRIPTION OF INVENTION

This invention provides a bearing on the axis of the screw jack to permit one or both spring cups (and hence one or both ends of the spring) to rotate freely relative to each other.

DETAILED DESCRIPTION OF INVENTION

Figure 1:
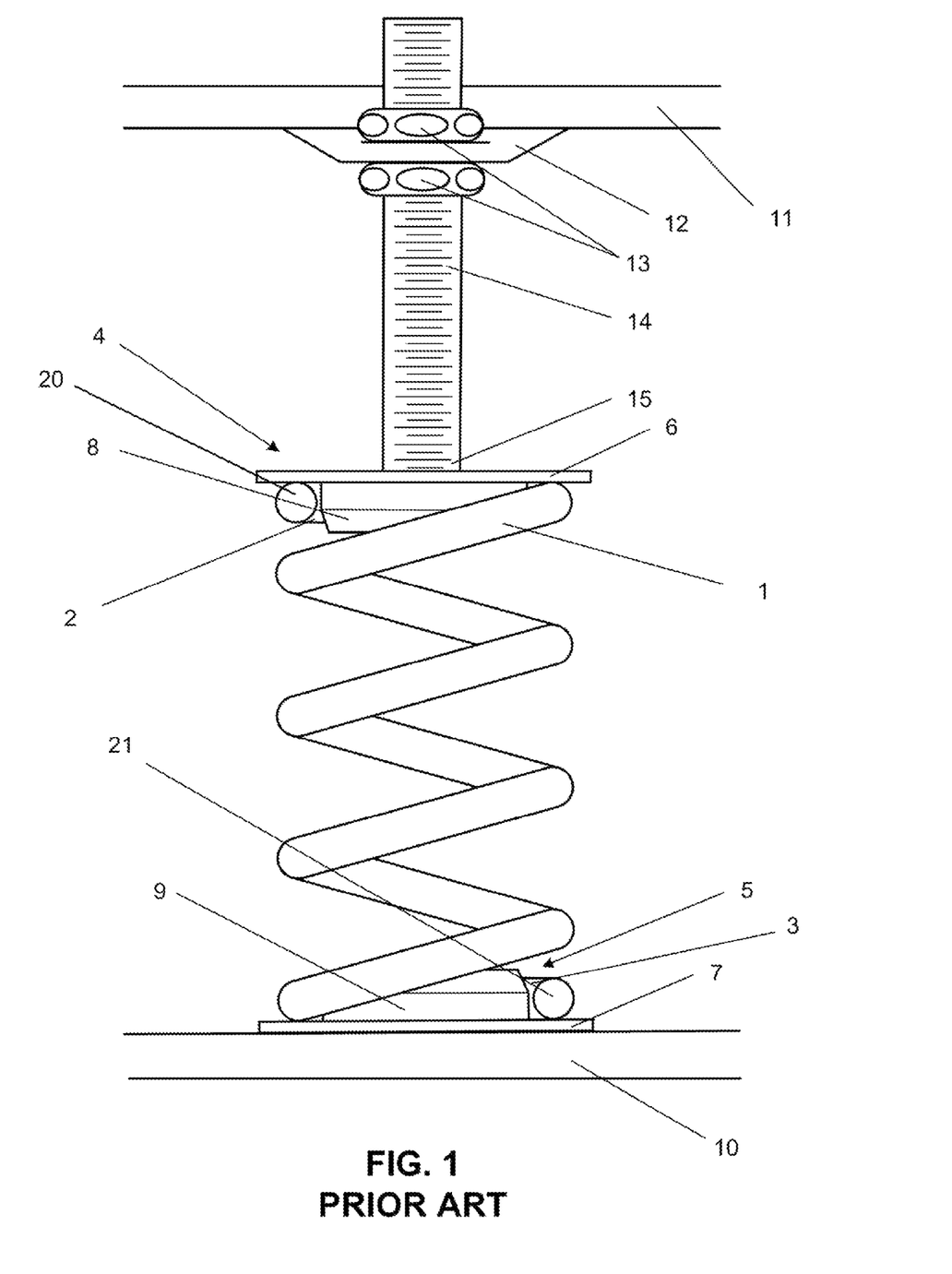
FIG. 1 is a side view of the prior art spring and spring cup assembly.

Referring now to the drawings, in which like reference numerals refer to like elements in each drawing, FIG. 1 is a side view of the prior art spring and spring cup assembly in a race car running straight and level on a smooth road. The view here is from the right side of the car with the tire, wheel and wheel well structure, and steering gear removed, so that the spring 1 and spring support structure can readily be seen. Spring 1 as shown here is helical in form, its axis disposed more or less vertically, with uppermost turn 2 and lowermost turn 3 being portions of circles disposed more or less horizontally. It should be noted here, however, that spring 1 need not be helical so long as its upper and lower ends (20 and 21 respectively) are compatible with appropriately-shaped spring cups as described below. For example, the spring could be of linear elastic material or one comprising gas compression features. Spring 1 is shown here with only 4½ helical turns (hereinafter called flights) for clarity; typically such a spring will comprise more flights, but the actual number of spring flights is not important. Spring 1 is held in place by an upper spring cup 4 and a lower spring cup 5. The cups 4 and 5 are typically made of cast or spun alloy and comprise upper and lower circular flanges 6 and 7 and cylindrical collars 8 and 9, respectively. Upper flange 6 presses downwardly on uppermost turn 2 of spring 1 under the weight of the suspended load. The only portion of the suspended load shown here is frame rail 11 and an adjustment bracket 12, the adjustment bracket: being sandwiched between nuts 13 on threaded jackscrew 14. Other means of attaching the suspended load to the jackscrew known in the prior art, including means for adjusting the jackscrew laterally and longitudinally as well as in the vertical position relative to the suspended load, are contemplated by this invention but, in the interest of clarity, are not shown here.

The bottom end 15 of jackscrew 14 is fixed (typically bolted or welded) to the upper side 135 of upper flange 6. The proportion of the total vehicle suspended load weight supported by spring 1 can be changed relative to the other three springs (not shown) by raising or lowering nuts 13 or by turning the jackscrew 14 within them using a square drive recess in the top (not shown). The lower cup 5 is fixedly attached to a wheel assembly part 10. Theoretically, at least, the jackscrew 14 could be fixed to the underside of lower flange 7 and adjusted from below.

It should be noted here that this invention encompasses the jackscrew 14 being raised and lowered relative to its support (e.g. frame rail 11 in FIG. 1) by other mechanical means, such as by ratchet levers or by electric, pneumatic, or hydraulic; positioners. This invention also encompasses allowing a vehicle occupant to adjust the position of jackscrew 14 remotely, and utilizing force and position sensors to adjust the position of jackscrew 14 automatically.

Figure 2:
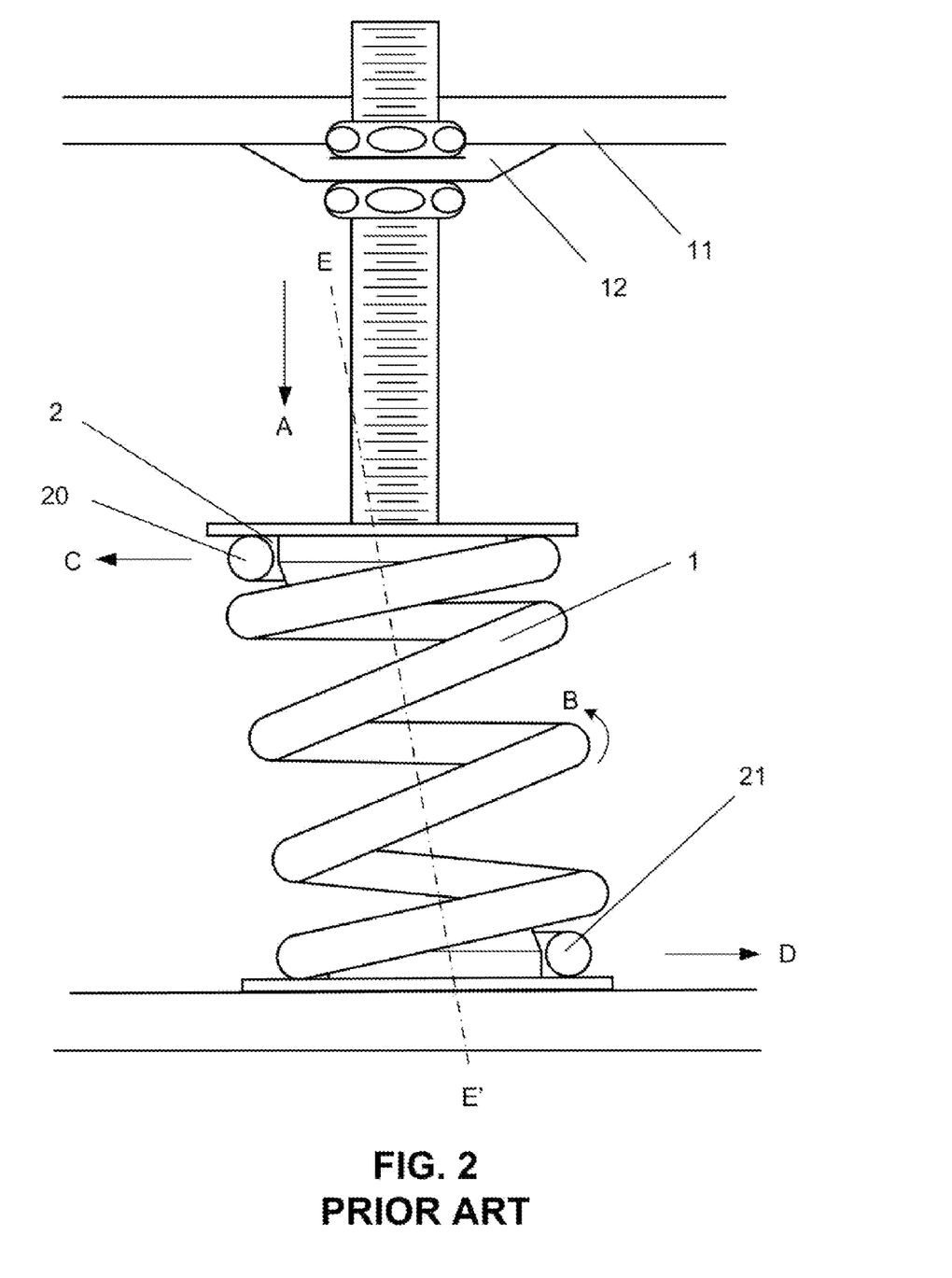
FIG. 2 is a side view of the prior art spring and spring cup assembly under added vertical compression.

FIG. 2 is a side view of the prior art spring and spring cup assembly under added vertical compression, such as is experienced by the springs on the right side of a race car in a sudden left turn. This added compression is represented here by arrow A, manifesting itself in downward movement of frame rail 11 and connected pads down to and including uppermost turn 2 of spring 1. The added compression of spring 1 results in increased torsion of spring elements (represented by arrow B) causing the spring flights to move closer together, and also mutually-reactive horizontal forces C and D caused by the vertical compression moving upper spring end 20 and lower spring end 21 closer together. Again, as discussed earlier, these horizontal distorting forces will occur if the spring ends 20 and 21 cannot revolve relative to one another about the spring helix axis E-E'. In the prior art, shown here, spring ends 20 and 21 are essentially fixed frictionally against flanges 6 and 7 due to the large weight involved and the mutual friction between the spring ends and the flanges. The end result is the visible distortion of the spring and concomitant distortion of and binding of the jackscrew at the adjustment bracket 12.

Figure 3:
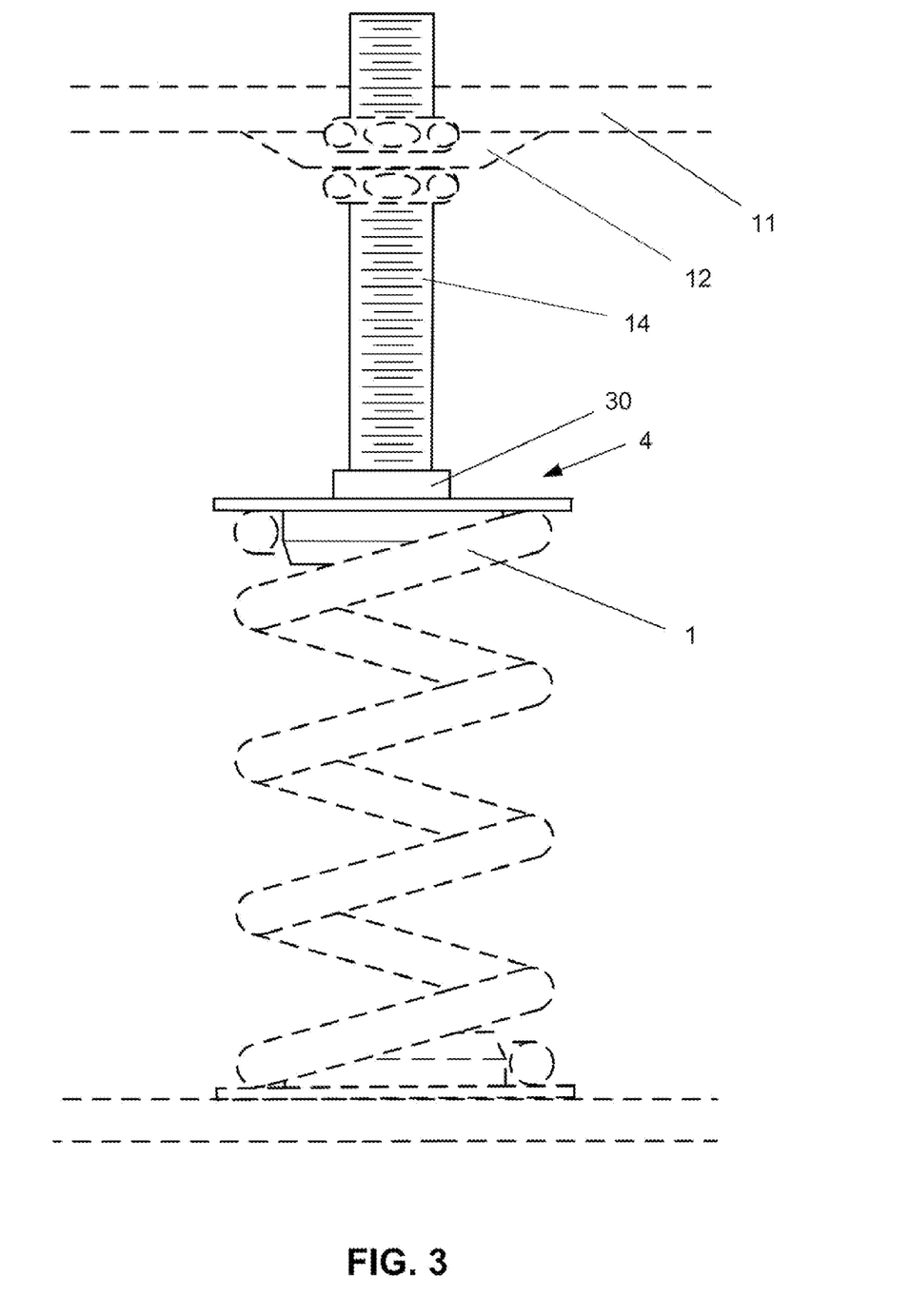
FIG. 3 is a side view of the preferred embodiment of the invention.

FIG. 3 is a side view of the preferred embodiment of the invention running straight and level on a smooth road. In this view, all parts environmental to the present invention are shown in dashed lines. Thus, the invention's visible parts here comprise a modified jackscrew 14, a bearing housing 30, and a modified upper spring cup 4. The principal function of the invention is the same as that of the prior art, namely, to support spring 1 and mechanically couple the automobile's suspended load to the wheel assembly. The novel construction of the invention, however (in particular the internal components of the bearing collar 30, which solve the problem of spring distortion and harmful forces) are more fully described in the following figure.

This invention not only relieves the above-described unproductive forces within the assembly to allow for greater spring rate consistency throughout the spring travel, it also relieves the angular forces that would otherwise bind the jackscrew threads inside the adjustment bracket 12 on the frame rail 11 and allows the jackscrew to be adjusted (turned about its axis) without trying to twist the upper spring cup 4 against the compressed spring. The relief of tension, when used on all four corners of the vehicle, will greatly improve the balance of the vehicle in that it will produce more predictable compression and rebound, thus aiding in the selection of shocks, sway bars and the overall initial setup of the weights and balance of the vehicle.

Figure 4:
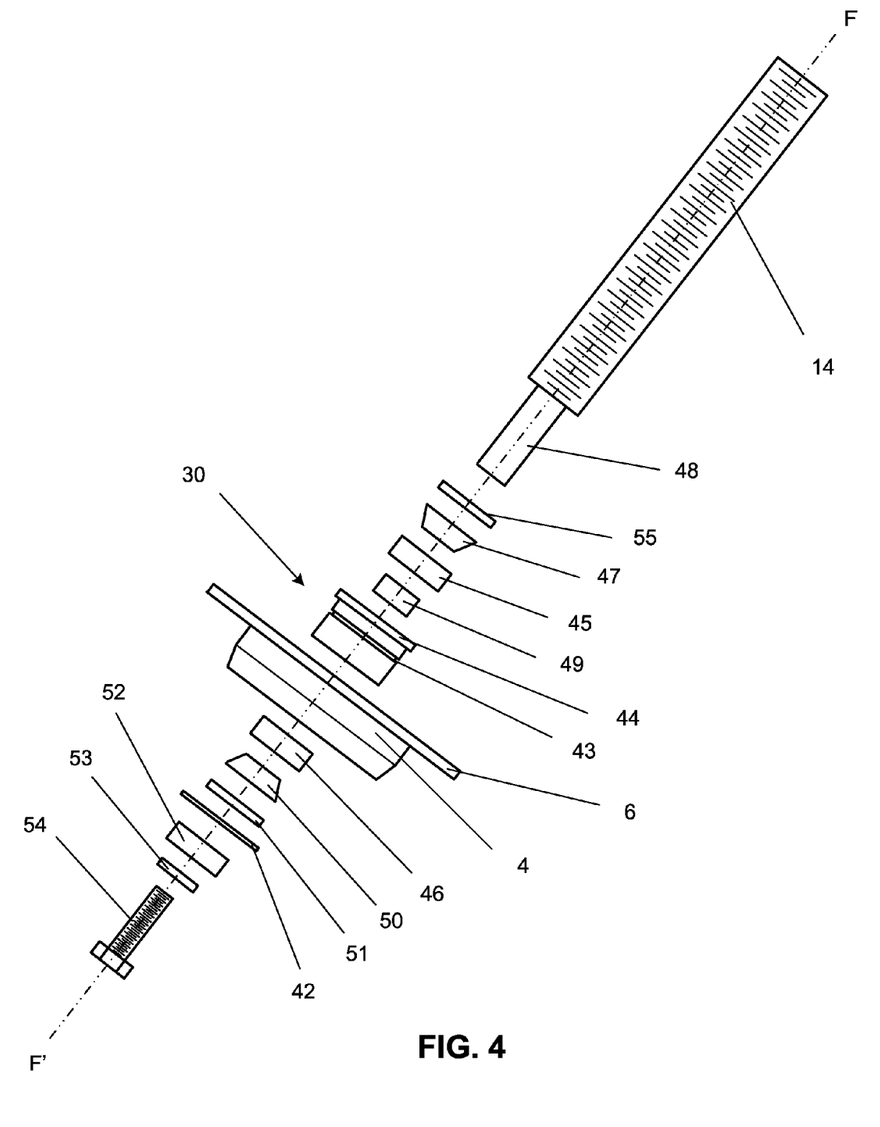
FIG. 4 is a side exploded view of the preferred embodiment of the invention.

FIG. 4 is a side exploded view of the preferred embodiment of the invention. It utilizes bearings (in this instance, a pair of beveled roller bearings 47 and 50) to permit upper spring cup 4 to revolve freely about axis F-F' of the assembly (which will remain collinear with the axis of the supported spring (not shown). Instead of fixing jackscrew 14 to cup 4 as in the prior art, here a hollow bearing housing 30 is inserted through the center of cup 4 and fixed in place either by being formed as a part of the cup, welded to the cup, or, as here, fixed to the cup by applying snap ring 42 to groove 43. This sandwiches flange 6 between housing lip 44 and snap ring 42. Upper and lower bearing races 45 and 46 are pressed into the interior of housing 30. Upper bearing 47 is fitted into upper race 45, and upper seal 55 is applied over upper bearing 47. The spring cup 4 with these parts is then placed on jackscrew neck 48. (jackscrew neck 48 is threaded inside to accept bolt 54.) Bearing spacer 49 is placed on the jackscrew neck 48, the spacer being of such thickness that lower bearing 50 can be placed over neck 48 and fit snugly against lower race 46. Lower seal 51 is then pressed over lower bearing 50. Lower spacer 52 is then placed on the end of neck 48, and the entire assembly is fastened to jackscrew 14 by washer 53 and bolt 54.

Figure 5:
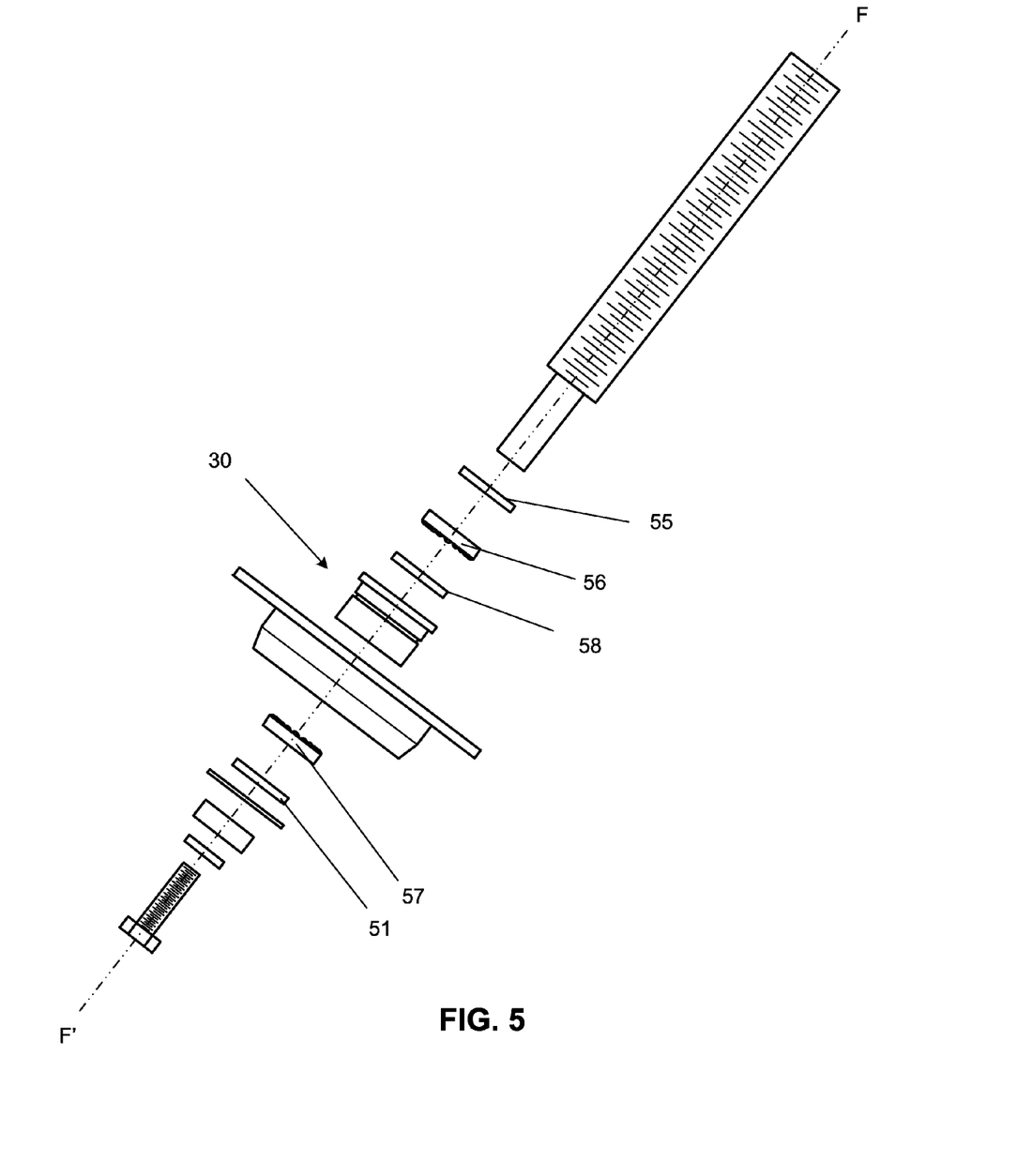
FIG. 5 is a side exploded view of the preferred embodiment of the invention with an alternative bearing configuration.

FIG. 5 is a side exploded view of the preferred embodiment equipped with upper and lower thrust bearings 56 and 57, respectively, here shown as annular ball bearings, to take the place of the upper and lower roller bearings 47 and 50 of FIG. 4. A single race 58 here replaces upper and lower races 45 and 46 (FIG. 4). To better withstand violent vertical impacts along axis F-F', race 58 is preferably welded, cast or machined into the center of housing 30. While FIGS. 4 and 5 show only beveled roller and annular ball bearings, other bearing combinations that would allow a spring cup to turn relative to the jackscrew are contemplated by this invention without limitation.

Figure 6:
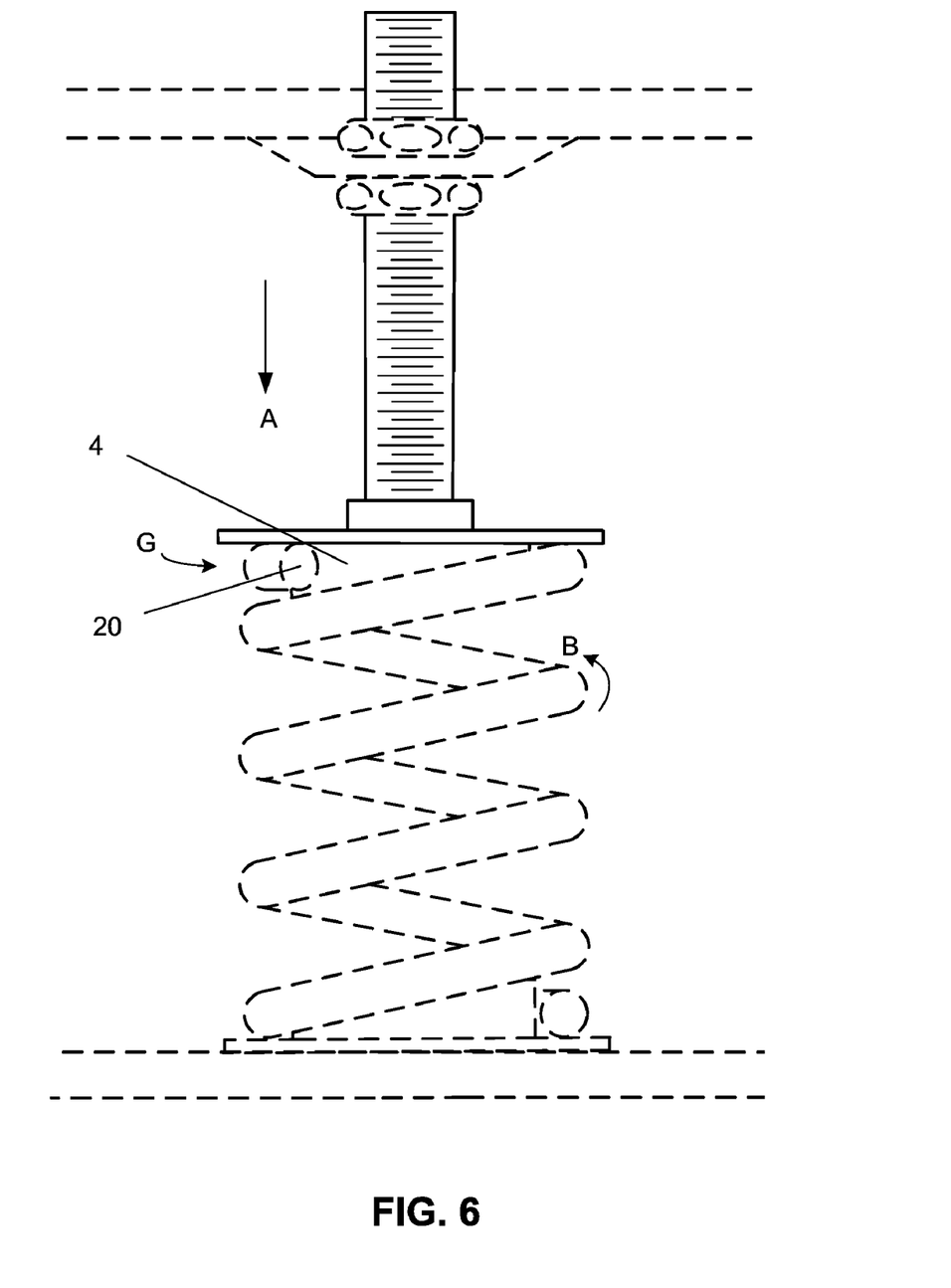
FIG. 6 is a side view of the preferred embodiment of the invention under added vertical compression.

FIG. 6 is a side view of the preferred embodiment under added vertical compression 200 (arrow A). Spring elements still undergo torsion as desired (arrow B) but because upper spring cup 4 can now revolve about a vertical axis with respect to all other parts, spring upper end 20 has revolved in a horizontal plane (arrow G), thus relieving the stresses that cause spring distortion and lateral forces as explained above and diagrammed in FIG. 2.

It should readily be envisioned that the objects of the invention will be equally well 205 satisfied by inverting the entire assemblies shown in FIGS. 3 through 6. The scope of this invention is also intended to encompass the use of duplicate assemblies applied to both upper and lower spring cups, should that be useful for additional stress relief or ease of adjustment.

The invention claimed is:

1. A spring mounting apparatus for a vehicle suspension, the vehicle suspension comprising two vehicle assemblies, namely, a suspended load and a wheel assembly, the weight of the suspended load held apart from the wheel assembly by a bias on at least one spring, the spring mounting apparatus comprising:
  a spring having a spring axis, an uppermost turn, and a lowermost turn; and wherein at least one of the uppermost turn and the lowermost turn is connected to at least one of two vehicle assemblies by a means for allowing unimpeded rotation of at least one of the uppermost turn and the lowermost turn about the axis relative to the at least one of the two vehicle assemblies as the bias on the spring varies;
  the means for allowing unimpeded rotation comprises:
    a shaped cup
      having an axis and being shaped so as to grip the at least one of the upper end and the lower end to maintain substantial alignment of the spring axis with the cup axis; and
      comprising a first bearing contact surface having a bearing axis, the first bearing contact surface being fixed to the shaped cup in such an orientation that the bearing axis is substantially coaxial with the cup axis; and
    a second bearing contact surface
      sharing the bearing axis of the first bearing contact surface, the second bearing contact surface being fixed to the at least one of two vehicle assemblies by a second bearing contact surface holder in such an orientation that the second bearing contact surface is maintained in rotational engagement with the first bearing contact surface;
        the second bearing contact surface holder comprises a means for adjusting the distance between the upper end and the first vehicle assembly;
  the first vehicle assembly is a suspended load;
  the second vehicle assembly is a wheel assembly, the suspended load being suspended upon the wheel assembly by the at least one spring; and
  the means for allowing unimpeded rotation is fixed to the suspended load by the second bearing contact surface holder; and
  the first bearing contact surface and said the second bearing contact surface respectively comprise elements taken from the list of:
    (a) a collar and a mating groove;
    (b) a groove and a mating collar;
    (c) a first race and a second race with rolling elements therebetween;
    (d) a convex shaft end and a mating thrust-receiving concavity; and
    (e) a concave shaft end and a mating thrust-receiving convexity.

2. A vehicle having a first assembly held apart from a second assembly by at least one spring, wherein:
  an at least one spring has a spring axis, a upper end and a lower end; and
  at least one of the two ends is connected to at least one of the two assemblies by a means for allowing unimpeded rotation of at least one of the two ends about the axis relative to the at least one of the two assemblies as the bias on the spring varies;
  the means for allowing unimpeded rotation comprises
    a shaped cup having
      having an axis and being shaped so as to grip the at least one of the two ends to maintain substantial alignment of the spring axis with the cup axis; and
      comprising a first bearing contact surface having a bearing axis, the first bearing contact surface being fixed to the shaped cup in such an orientation that the bearing axis is substantially coaxial with the cup axis; and
    a second bearing contact surface sharing the bearing axis of the first bearing contact surface, the second bearing contact surface being fixed to the at least one of two assemblies by a second bearing contact surface holder in such an orientation that the second bearing contact surface is maintained in rotational engagement with the first bearing contact surface;
      the second bearing contact surface holder comprises a means for adjusting the distance between the upper end and the first vehicle assembly;
  the first assembly is a suspended load;
  the second assembly is a wheel assembly, the suspended load being suspended upon the wheel assembly by the at least one spring; and
  the means for allowing unimpeded rotation is fixed to the suspended load by the second bearing contact surface holder;
  the first bearing contact surface and the second bearing contact surface respectively comprise elements taken from the list of:
    (a) a collar and a mating groove;
    (b) a groove and a mating collar;
    (c) a first race and a second race with rolling elements therebetween;
    (d) a convex shaft end and a mating thrust receiving concavity; and
    (e) a concave shaft end and a mating thrust receiving convexity.

3. A spring mounting apparatus for a vehicle suspension utilizing at least one helical spring 1, comprising:
  a substantially circular spring cup 4 having a center;
  a substantially vertical threaded jackscrew 14 for adjusting the vertical position of the spring cup 4 relative to the suspended load of the vehicle;
  the jackscrew further comprising
    threads for engagement with mating threads on the suspended load of the vehicle;

a neck 48 depending vertically and co-axially from the jackscrew 14;

the spring cup 4 being fastened to the neck 48 and further comprising a flange 6 supported by the uppermost turn 2 of spring 1, the lowermost turn 3 of spring 1 being fixed to the wheel assembly of the vehicle;

a bearing having an axis and an outer bearing contact surface being fixed to, and co-axially through, the center of the spring cup; and the bearing having an inner bearing contact surface being fixed to the jackscrew neck 48 the outer bearing contact surface further comprising an upper bearing race 45 and a lower bearing race 46 frictionally engaged to jackscrew neck 48; and the inner bearing contact surface further comprising an upper bearing 47 and a lower bearing 50, each frictionally engaged to the spring cup 4, and each further comprising rolling elements in contact with the upper bearing race 45 and a lower bearing race 46, enabling the spring cup 4 to rotate about the jackscrew neck 48.

4. A vehicle having a spring mounting apparatus for a vehicle suspension utilizing at least one helical spring 1, comprising:

a substantially circular spring cup 4 having a center;

a substantially vertical threaded jackscrew 14 for adjusting the vertical position of the spring cup 4 relative to the wheel assembly of the vehicle;

the jackscrew further comprising threads for engagement with mating threads on the wheel assembly of the vehicle;

a neck 48 extending vertically upward and co-axially from the jackscrew 14;

the spring cup 4 being fastened to the neck 48 and further comprising a flange 6 supporting the lowermost turn 3 of spring 1, the uppermost turn 2 of spring 1 being fixed to the suspended load of the vehicle;

a bearing having an axis and an outer bearing contact surface being fixed to, and co-axially through, the center of the spring cup; and the bearing having an inner bearing contact surface being fixed to the jackscrew neck 48 the outer bearing contact surface further comprising an upper bearing race 46 and a lower bearing race 45 frictionally engaged to jackscrew neck 48; and the inner bearing contact surface further comprising an upper bearing 50 and a lower bearing 47, each frictionally engaged to the spring cup 4, and each further comprising rolling elements in contact with the upper bearing race 46 and a lower bearing race 45, enabling the spring cup 4 to rotate about the jackscrew neck 48.

\* \* \* \* \*